United States Patent Office 3,492,322
Patented Jan. 27, 1970

3,492,322
Δ¹-3,3-METHYLENE-STEROIDS OF THE OESTRANE SERIES
Nicolaas Pieter van Vliet, Oss, Netherlands, assignor to Organon Inc., West Orange, N.J., a corporation of New Jersey
No Drawing. Filed Mar. 20, 1967, Ser. No. 624,162
Claims priority, application Netherlands, Mar. 29, 1966, 6604084
Int. Cl. C07c 169/08; A61k 17/00
U.S. Cl. 260—397.5    2 Claims

ABSTRACT OF THE DISCLOSURE

The present invention relates to novel Δ¹-3,3-methylene-oestrenes which may be substituted in 6-, or 7-position with a methyl group.

These compounds are important on account of their strong anabolic, oestrogenic, progestational and ovulation-inhibiting properties.

---

The invention relates to a group of novel 3,3-methylene-steroids and to a process for the preparation thereof.

More particularly the invention relates to the manufacture of novel compounds of the general formula:

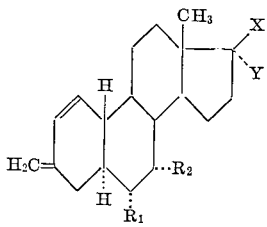

in which
$R_1$ = hydrogen or methyl,
$R_2$ = hydrogen or methyl, in which $R_1$ and $R_2$ cannot simultaneously be methyl,
X = OH or OAcyl,
Y = H or a saturated or unsaturated aliphatic hydrocarbon radical with 1–4 C-atoms, or X+Y = keto group.

These novel compounds are prepared by starting from a compound of the formula:

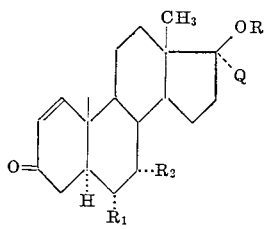

in which
$R_1$ and $R_2$ have the meaning indicated above, and
R = hydrogen or an acyl group, and
Q = hydrogen or a saturated or unsaturated aliphatic hydrocarbon radical, by converting the 3-keto group into a 3,3-methylene group either by treatment with a phosphine methylidene compound or by converting the 3-keto group into a 3-methyl, 3-hydroxyl-, or 3-methyl-3-halogen grouping by any method known per se, followed by dehydratation or dehydrohalogenation, after which 17-alkylation and/or esterification of the 17-hydroxyl group can take place.

The phosphine-methylidene compound to be used as Witting reagent in the 3,3-methylidation has the general formula:

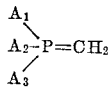

in which $A_1$, $A_2$ and $A_3$ represent possibly substituted phenyl groups. The reaction is usually performed with triphenylphosphinemethylidene.

These compounds are prepared by reacting the relative triphenylphosphine with a methylhalide for the manufacture of the corresponding phosphonium halide, after which this compound is converted into the desired triphenylphosphinemethylidene under the influence of a base.

The reaction proceeds according to the scheme:

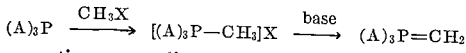

The reaction according to the invention can now be performed in such a manner that the relative Δ¹-3-keto-19-nor-steroid is added to the phosphine-methylidene compound. As the latter compound is unstable, however, and is easily converted under the influence of air or moisture, it is to be preferred to prepare this compound fresh and not to isolate it.

Hence the reaction is usually performed by adding the steroid or a solution thereof to a mixture of the phosphonium-halide of the general formula given above

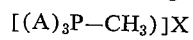

together with a suitable base in the presence of a suitable organic solvent in the absence of oxygen, for instance by working in nitrogen atmosphere.

As suitable bases can be mentoined alkali metal compounds of aliphatic, aromatic or araliphatic hydrocarbons, such as butyl lithium, phenyl lithium and triphenyl methylsodium, alkyl magnesium halides, such as ethyl magnesium bromide, alkali metal amides and alkali metal alcoholates or with dimsyl sodium reaction product of sodiumhydride and dimethyl sulfoxide.

As solvents may be applied aliphatic ethers, such as dimethyl ether, diethyl ether, dioxane or tetrahydrofuran and aromatic hydrocarbons, such as benzene or toluene.

The steroid to be used as starting product may already possess an esterified hydroxyl group in 17-position, but it is also possible that esterification takes place after the introduction of the 3,3-methylene group.

The 17-acyloxy group, which is either present already in the starting product or introduced after the Wittig reaction, is preferably derived from an aliphatic, aromatic or aliphatic carboxylic acid with 1–18 carbon atoms.

As examples of such acids are mentioned: acetic acid, propionic acid, butyric acid, valeric acid, capric acid, undecylic acid, lauric acid, tridecylenic acid, pentadecylic acid, oleic acid, palmitic acid, stearic acid, adamantane carboxylic acid, myricinic acid, trimethyl acetic acid, diethyl acetic acid, hexahydro benzoic acid, cyclopentyl propionic acid, cyclohexyl propionic acid, cyclohexyl butyric acid, undecylenic acid, benzoic acid, phenyl acetic acid, phenyl propionic acid, phenyl butyric acid, malonic acid, succinic acid, glutaric acid, pimelic acid and tartaric acid.

In the Wittig reaction the relative ester may be taken as starting material for the manufacture of the 17-esters of the relative 3,3-methylene-steroids wih a tertiary 17-hydroxyl group, but this group may also be introduced after that. In the latter case the acylation should be performed in basic medium as the Δ⁴-3,3-methylene grouping in sensitive to acid.

If the desired steroid possesses a 17-alkyl group, two methods may be adopted again for the preparation of such a compound, viz. by starting from a 17-alkylated compound or by the introduction of such a group after the Wittig reaction.

The latter conversion is performed by careful oxidation of the $\Delta^1$-3,3-methylene-17$\beta$-hydroxy-oestrene prepared by the process of the invention, e.g. by the Oppenauer method or with chromic acid/pyridine, into the corresponding 17-keto compound, after which this compound can be converted into the desired 17-saturated or unsaturated alkyl derivative in a known manner by an alkylation reaction.

If the desired final product is a 17$\alpha$-ethynyl compound or in general a compound substituted in 17-position by an unsaturated alkyl group with a terminal ethynyl group, this group is preferably introduced after the Wittig reaction.

The saturated or unsaturated hydrocarbon radical present in the final products in 17-position is for instance a methyl, ethyl, propyl, isopropyl, butyl, vinyl propenyl, allyl, methallyl, ethynyl, propynyl, or butynyl radical.

The 3,3-methylene-oestrenes according to the invention can also be prepared by treating a $\Delta^1$-3-keto-oestrene compound, possibly methylated in ring B, with a methyl metal derivative, such as methyl lithium, for the preparation of the corresponding 3-methyl-3-hydroxy-steroids. Next the 3-hydroxyl group can be split off, for example by treatment with an acid or another dehydratation agent, if desired after esterification of this group.

It is also possible to replace the 3-hydroxyl group first by a halogen atom, viz. by chlorine or bromine, by treatment with a known halogenating agent, after which the resulting 3-halogen-3-methyl-oestrene compound is converted into the desired $\Delta^1$-3,3-methylene-oestrene compound by treatment with a dehydrohalogenating agent, for example an alkali metal carbonate or an alkaline earth metal carbonate, if desired, in the presence of an alkali metal halide, such as lithium bromide, or by treatment with another base, such as collodine or potassium hydroxide.

The compounds according to the invention are especially important on account of their strong anabolic, oestrogenic, progestative and ovulation inhibiting properties.

The invention is further illustrated by the following examples:

EXAMPLE I

Of a 1.30 N solution of n-butyl lithium in ether 140 ml. were added to a vigorously stirred suspension of 71.5 gm. of triphenyl methyl phosphonium bromide in 1000 ml. of absolute ether in nitrogen atmosphere. After stirring for 2 hours at room temperature a solution was added of 10.9 gm. of 17$\beta$-hydroxy-$\Delta^1$-5$\alpha$-oestren-3-one in 800 ml. of absolute ether. After stirring for 16 hours at room temperature the ether was distilled off while adding tetrahydrofuran dropwise. Next the mixture was refluxed for 2 hours, cooled down, poured into water and extracted with ether. The ethereal extract was washed with water and dried. The residue obtained after evaporation of the solvent was taken up in 700 ml. of 70% methanol and extracted with petroleum ether. This extract was washed with water and dried, and yielded after evaporation of the solvent a residue of 7.0 gm., which was dissolved in benzene and filtered over 35 gm. of $Al_2O_3$. Recrystallisation from hexane yielded 6.8 gm. of 3,3-methylene-$\Delta^1$-5$\alpha$-oestren-17$\beta$-ol.

Melting point 100–102° C.; $[\alpha]_D = +101°$ (chloroform).

$\gamma_{max} = 234$ m$\mu$; $\epsilon = 20,900$.

EXAMPLE II

Of a 1.20 N solution of phenyl lithium in ether 150 ml. were added to a stirred suspension of 71.5 gm. of triphenyl methyl phosphoniumbromide in 1000 ml. of absolute ether in nitrogen atmosphere. After stirring for 1 hour at room temperature a solution was added of 12.6 gm. of 17$\beta$-acetoxy-$\Delta^1$-5$\alpha$-oestren-3-one in 350 ml. of absolute tetrahydrofuran, after which the mixture was stirred for 16 hours at room temperature. Next it was subjected to distillation until the temperature of the distilling vapour had reached 60–65° C. During this distillation the volume was kept stationary by adding tetrahydrofuran dropwise. After refluxing the mixture for 1 hour it was poured into water and processed as described in Example I. The crude residue (8.2 gm.) was incorporated in a mixture of 40 ml. of pyridine and 7 ml. of acetic anhydride. The mixture was left to stand for 16 hours, after which it was poured into water and weekly acidified with 2 N $H_2SO_4$. Next it was extracted with methylene chloride. The extract was washed with water until neutral and dried. Evaporation of the solvent at reduced pressure, filtration of the residue in a benzenic solution over 30 gm. of $Al_2O_3$ and recrystallisation from methanol yielded 6.9 gm. of 3,3-methylene-$\Delta^1$-5$\alpha$-oestren-17$\beta$-ol-17$\beta$-acetate.

Melting point 120–124° C.; $[\alpha] = +93\%$ (chloroform).

In an analogous manner other 17-esters were prepared derived from butyric acid, capric acid, lauric acid, $\beta$-phenyl propionic acid and cyclohexyl butyric acid.

EXAMPLE III

Of a 1.20 solution of n-butyl lithium in ether 76 ml. were added to a stirred suspension of 36.0 gm. of triphenyl methyl phosphoniumbromide in 500 ml. of absolute ether in nitrogen atmosphere. After stirring for 2 hours at room temperature a solution was added of 6.0 gm. of 17$\beta$-hydroxy-17$\alpha$-methyl-$\Delta^1$-5$\alpha$-oestren-3-one in 350 ml. of absolute ether. Stirring was continued for 16 hours, after which the ether was distilled off while adding tetrahydrofuran dropwise. After refluxing for 2 hours the mixture was cooled down and processed as described in Example I. After filtration in a benzenic solution over 30 gm. of $SiO_2$ and recrystallisation from hexane the residue gave the 3,3-methylene-17$\alpha$-methyl-$\Delta^1$-5$\alpha$-oestren-17$\beta$-ol in a yield of 3.6 gm.

Melting point 124–127° C.

In the same way 3,3 - methylene - 17$\alpha$ - ethyl - $\Delta^1$ - 5$\alpha$ - oestren-17$\beta$-ol and 3,3-methylene-17$\alpha$-butyl-$\Delta^1$-5$\alpha$-oestren-17$\beta$-ol were prepared starting from the corresponding 3-keto-oestrenes.

EXAMPLE IV

Ten grams of 3,3-methylene-$\Delta^1$-5$\alpha$-oestren-17$\beta$-ol were dissolved in a mixture of 300 ml. of dry toluene and 100 ml. of cyclohexanone, after which 50 ml. of toluene were distilled off. A solution of 5.0 gm. of aluminium isopropylate in 200 ml. of dry toluene was added dropwise in a period of 15 minutes, after which the mixture was refluxed for 2 hours in nitrogen atmosphere. After the addition of 150 ml. of water and 50 gm. of Seignette's salt the mixture was subjected to steam distillation, followed by extraction with chloroform. After washing until neutral and drying of the extract a residue was obtained of 9.8 gm. by evaporation of the solvent. After dissolving in benzene, filtration over 100 gm. of $SiO_2$ and recrystallisation from methanol 6.9 gm. of 3,3-methylene-$\Delta^1$-5$\alpha$-oestren-17-one were obtained.

Melting point 103–106° C.

EXAMPLE V

In a flask protected against atmospheric moisture a mixture of 2.4 gm. of potassium, 12 ml. of absolute isopropanol and 40 ml. of absolute benzene were refluxed in nitrogen atmosphere till the potassium had dissolved. Next dry acetylene gas was bubbled through the mixture for 2 hours at 0° C. After that 4.0 gm. of 3,3-methylene-$\Delta^1$-5$\alpha$-oestren-17-one dissolved in 20 ml. of absolute benzene and 18 ml. of absolute tetrahydrofuran were added, whereupon stirring took place for 4 hours at room temperature while bubbling through acetylene gas. The mixture was poured into ice-water and next extracted with methylene chloride. The extract was washed with water until neutral and dried. After evaporation of the solvent and recrystallisation of the residue from diisopropyl ether 2.9 gm. of 3,3-methylene-17α-ethynyl-Δ¹-5α-oestren-17β-ol were obtained.

Melting point 130–134° C.

EXAMPLE VI

To a solution of methylmagnesiumiodide in ether, prepared from 1.65 gm. of magnesium turnings, 7.5 ml. of methyl iodide and 75 ml. of absolute ether was added dropwise a solution of 3.0 gm. of 3,3-methylene-Δ¹-5α-oestren-17-one in 60 ml. of absolute ether. The mixture was refluxed for 4 hours, whereupon it was cooled down and poured into a dilute solution of ammonium chloride. Extraction with chloroform, washing of the extract with water until neutral, drying and evaporation of the solvent yielded a residue of 2.8 gm. Filtration in a benzenic solution over 15 mg. of Al$_2$O$_3$ and recrystallisation from hexane yielded 2.0 gm. of 3,3-methylene-17α-methyl-Δ¹-5α-oestren-17β-ol.

Melting point 124–127° C.

EXAMPLE VII

To an ethereal solution of methylmagnesiumiodide, prepared from 1.3 gm. of magnesium turnings, 6 ml. of methyliodide and 50 ml. of absolute ether was added a solution of 2.0 gm. of 17β-hydroxy-Δ¹-5α-oestren-3-one in 50 ml. of absolute ether. The mixture was refluxed for 5 hours and next processed as described in Example VI. The residue (2.1 gm.) was dissolved in 30 ml. of glacial acetic acid and refluxed for 1 hour in nitrogen atmosphere. After cooling down it was poured into water. Extraction with chloroform, washing of the extract with saturated solution of sodium carbonate and next with water until neutral, followed by drying and evaporation of the solvent at reduced pressure yielded a residue of 1.9 gm. This residue was chromatographed over 60 gm. of aluminium oxide to obtain the 3,3 - methylene - Δ¹ - 5α - oestren-17β-ol.

EXAMPLE VIII

To 2.9 gm. of 3,3 - methylene - 17α - methyl - Δ¹ - 5α - oestren - 17β - ol dissolved in 180 ml. of absolute ether were added. 22.8 ml. of a 1.10 N solution of ethylmagnesiumbromide in ether. After 5 minutes 1.75 ml. of acetyl chloride were added. After standing overnight at room temperature the reaction mixture was diluted with water and extracted with methylene chloride. The extract was washed with a saturated solution of sodium bicarbonate and next with water until neutral. After drying the solvent was evaporated. The residue was dissolved in benzene and filtered over aluminium oxide to obtain the 3,3 - methylene - 17α - methyl - Δ¹ - 5α - oestren - 17β - ol - 17β - acetate.

In an analogous manner the 17 - esters were prepared derived from valeric acid, oenanthic acid and β - phenyl propionic acid.

EXAMPLE IX

Seventy-five ml. of a 1.20 N solution of n - butyl lithium in ether were added to a stirred suspension of 35.7 gm. of triphenyl phosphonium bromide in 500 ml. of absolute ether in nitrogen atmosphere. After stirring for 2 hours at room temperature a solution of 5.8 gm. of 6α - methyl - 17β - hydroxy - Δ¹ - 5α - oestren - 3 - one in 350 ml. of absolute ether was added. After stirring for 16 hours at room temperature the ether was distilled off while adding tetrahydrofuran dropwise. The mixture was refluxed for 2 hours and processed as described in Example I to obtain 3,3 - methylene - 6α - methyl - Δ¹ - 5α - oestren - 17β - ol. In the same manner the 3,3 - methylene-7α - methyl - Δ¹ - 5α - oestren - 17β - ol was obtained starting from 7α - methyl - 17β - hydroxy - Δ¹ - 5α - oestren - 3 - one.

In the manner as described in the Examples II and VIII the above compounds have been converted into the corresponding 17 - esters derived from acetic acid, capric acid, trimethyl acetic acid and β - phenyl propionic acid.

EXAMPLE X

Five grams of 3,3 - methylene - 6α - methyl - Δ¹ - 5α - oestren - 17β - ol were dissolved in a mixture of 170 ml. of dry toluene and 60 ml. of cyclohexanone, after which 40 ml. of toluene were distilled off. A solution of 2.6 gm. of aluminium isopropylate in 100 ml. of dry toluene was added dropwise in a period of 10 minutes, after which the mixture was refluxed for 2 hours. After the addition of 100 ml. of water and 25 gm. of Seignette's salt the mixture was processed as described in Example IV to obtain the 3,3 - methylene - 6α - methyl - Δ¹ - 5α - oestren - 17 - one.

In the same manner the 3,3 - methylene - 7α - methyl - Δ¹ - 5α - oestren - 17 - one was obtained starting from the 3,3 - methylene - 7α - methyl - Δ¹ - 5α - oestren - 17β - ol.

EXAMPLE XI

In a flask protected against atmospheric moisture a mixture of 1.2 gm. of potassium, 10 ml. of absolute isopropanol and 20 ml. of absolute benzene was refluxed till the potassium had dissolved. Next dry acetylene gas was bubbled through for 1 hour at 0° C., after which 2.0 gm. of 3,3 - methylene - 6α - methyl - Δ¹ - 5α - oestren - 17 - one dissolved in 10 ml. of absolute benzene and 10 ml. of absolute tetrahydrofuran were added. Next stirring took place at room temperature for 4 hours while bubbling through acetylene gas. After processing in accordance with Example V the 3,3 - methylene - 6α - methyl - 17α - ethynyl - Δ¹ - 5α - oestren - 17β - ol was obtained.

In the same manner 3,3 - methylene - 7α - methyl - 17α - ethynyl - Δ¹ - 5α - oestren - 17β - ol has been prepared.

EXAMPLE XII

To a solution of methylmagnesiumiodide in ether, prepared from 1.65 gm. of magnesium turnings, 7.5 ml. of methyliodide and 75 ml. of absolute ether, was added dropwise a solution of 3.0 gm. of 3,3 - methylene - 7α - methyl - Δ¹ - 5α - oestren - 17 - one in 60 ml. of absolute ether. After refluxing for 4 hours the mixture was processed as described in Example VI to obtain the 3,3 - methylene - 7α, 17α - dimethyl - Δ¹ - 5α - oestren - 17β - ol.

In an analogous manner Δ¹ - 3,3 - methylene - 6α - methyl - 17 - keto - oestrene has been converted into the corresponding 17β - hydroxy, 17α - ethyl-, 17β - hydroxy, 17α - propyl-, and 17α - allyl - derivatives. Esterification of these compounds yielded the 17 - esters derived from acetic acid, valeric acid, β - phenyl propionic acid and stearic acid.

In an analogous manner Δ¹ - 3,3 - methylene - 7α - methyl - 17 - keto - oestrene has been converted into the corresponding 17β - hydroxy, 17α - ethyl-, 17β - hydroxy, 17β - butyl-, 17β - hydroxy, 17α - allyl-, and 17β - hydroxy, 17α - methallyl - derivatives. Esterification of these compounds yielded the 17 - esters derived from acetic acid, oenanthic acid, capric acid, lauric acid and trimethyl acetic acid.

What is claimed is:
1. Δ¹ - 3,3 - methylene - 17β - hydroxy - 17α - ethynyl-5α - oestrene.
2. Δ¹ - 3,3 - methylene - 7α - methyl - 17β - hydroxy - 17α - ethynyl - 5α - oestrene.

References Cited

UNITED STATES PATENTS 3,239,419   3/1966   Brückner et al. _____ 167—74

FOREIGN PATENTS 1,027,269   4/1966   Switzerland.

ELBERT L. ROBERTS, Primary Examiner

U.S. Cl. X.R.

260—397.3, 999